(12) United States Patent
McDonald et al.

(10) Patent No.: US 6,269,422 B1
(45) Date of Patent: Jul. 31, 2001

(54) SYSTEM AND METHOD FOR RETRIEVING TAPE STATISTICAL DATA

(75) Inventors: Kathryn Ann McDonald, Yorba Linda; Ralph Ernest Marsh, Canyon; Willis Lloyd Jacobs, Mission Viejo, all of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/209,985

(22) Filed: Dec. 10, 1998

(51) Int. Cl.[7] ................................................. G06F 12/00
(52) U.S. Cl. ............................................................. 711/111
(58) Field of Search ............................. 711/111, 4, 100, 711/161, 162

(56) References Cited

U.S. PATENT DOCUMENTS 5,287,478 * 2/1994 Johnston et al. ...................... 395/425
5,892,633 * 4/1999 Ayres et al. ........................ 360/73.08
6,101,575 * 8/2000 Simms et al. ......................... 711/117

\* cited by examiner

*Primary Examiner*—Kevin Verbrugge
(74) *Attorney, Agent, or Firm*—Alfred W. Kozak; Mark T. Starr; Rocco L. Adornato (57) ABSTRACT

In order to overcome the situation in magnetic tape drives, where an unload command would wipe-out the tape statistics so that no data would then be available which would indicate errors and other tape defects, there has been developed a system and method which permits the retrieval and storage of tape statistics in a Sumlog file. Specialized algorithmic sequences are used to initiate a Rewind/Unload tape request that invokes a COLLECT_TAPE_STATS procedure, (or else to an error handling procedure as a result of a counter overflow condition) which calls a COLLECT_LOG_SENSE_DATA procedure which then collects tape statistics for deposit into a recording medium.

8 Claims, 8 Drawing Sheets

FIG. 1

STATISTICAL DATA GATHERING/RECORDING

SYSTEM AND METHOD FOR RETRIEVING TAPE STATISTICAL DATA

CROSS-REFERENCES TO RELATED APPLICATIONS

This application is related to a co-pending companion application, U.S. Ser. No. 09/209,983, entitled "System and Method for Analyzing and Reporting Tape Statistics" which is incorporated herein by reference.

FIELD OF THE INVENTION

This disclosure relates to methods for gathering statistical data for Small Computer Systems Interface tapes.

BACKGROUND OF THE INVENTION

The term "SCSI Enhanced Tape" signifies the Unisys family of SCSI half-inch cartridge tape subsystems adhering to the ANSI SCSI-2 Standard. ANSI refers to the American National Standards Institute. Each SCSI Enhanced Tape drive uses a form of half-inch cartridge media. The 36-Track subsystems use a 3890 and/or 3890 Extended tape.

The 36-Track tape subsystems were introduced in 1993 by vendors such as IBM, Fujitsu, and StorageTek, as an increased capacity replacement for 18-Track tape subsystems. These 36-Track tape subsystems provide the ability to store twice the capacity of a regular 18-Track using the same media, and up to several times the capacity using a new, extended half-inch tape cartridge, assuming that both subsystems utilize data compression.

The SCSI 36-Track tapes involved herein are Unisys tape systems designated as the OST5136, the CTS5236, and the CLU9710-36T tape subsystems. The density requirements directly correlate to the FIPS (Federal Information Processing Standard) CTS5136 subsystems, in that they can read at the 18-Track density, and then either Read or Write at the 36-Track density. The SCSI 36-Track tapes are considered to be compatible with their FIPS counterparts. They are expected to read media written by the FIPS 36-Track or 18-Track subsystems and these FIPS subsystems are considered to be able to read media written by any of the SCSI 36-Track subsystems.

Other tapes involved in the present system are the CLU9710-DLT4 and the CLU9710-DLT7 tapes which were introduced by the Quantum Corporation as a high-performance, high-capacity streaming cartridge tape product. The CLU9710-DLT4 subsystem provides a formatted capacity of up to 40.0 GB on a DLTIV tape and sustained user data transfer rates of 10.0 MB/s assuming compression is being utilized. The CLU9710-DLT7 can provide 70.0 GB capacity under the same circumstances.

These enhanced type SCSI subsystems are being supported via newer Unisys A-Series and NX I/O platforms, for example, those designated as RMM/IOM platforms, and are currently only connected via a Native SCSI channel.

A number of functionalities are being provided in connection with these tape subsystems of which the present focus is that involving statistical data collection. After statistical data collection, an analysis and report is made as will be seen in co-pending U.S. Ser. No. 09/209,983 entitled "System and Method for Analyzing and Reporting Tape Statistics" which is incorporated herein by reference.

Statistical data gathering of a magnetic tape involves identifying various pages supported by the magnetic tape and then selecting certain data to indicate counts of such things as (i) Write errors; (ii) Read errors; (iii) Sequential-Access device information; (iv) Track errors.

The earlier method for gathering statistical data for a tape subsystem (such as the USR 5073) involved tagging an Unload command, and then upon completion of the Unload, issuing a single Log Sense I/O command to retrieve all the available statistical data for the drive. These internally stored statistics are cleared as result of a Log Select I/O command. The problem with this method is two fold; 1) SCSI Enhanced Tape drives do not necessarily support a page code designated "Return All Supported Pages"— which would not allow all the statistics to be retrieved with a single I/O; and 2) the tape drive's internally stored statistical data is cleared as a direct result of an "Unload" which would result in "just-cleared" statistics being retrieved with the pre-existing algorithm. Thus, this prior algorithmic method was never sufficient to gather the required statistical data for SCSI Enhanced Tapes.

One of the SCSI Enhanced tape drives, designated the "OST5136," does support a "Return All Supported Pages" page. However, the volume amount of information it returns is prohibitive since it requires a huge buffer dimension. Here, the buffer required would be significantly larger than the standard buffer required to piece together the data returned for each page, when each page is requested individually.

The present method and system provides a new algorithmic arrangement, whereby a new procedure designated "COLLECT_TAPE_STATS" is called out of the procedure, "REWINDIT", prior to issuing an Unload I/O. This new procedural method, while using another new procedure designated "COLLECT_LOG_SENSE_DATA", handles the collection and logging of the desired statistical data. Afterwards, and completely independently of the statistical data gathering, the "Unload" I/O is issued as requested by the user.

In addition to being called when an Unload I/O is performed, COLLECT_LOG_SENSE_DATA is also invoked when the tape drive notifies the system that its statistical data buffers are getting ready to "overflow." The software is notified of this overflow condition via a "Check Condition" status, which is translated into a Logical Result Descriptor value (LRD id) of LRDLOGCOUNTEROVERFLOWID. Then, an initial error handling routine designated "TERMINATEIOOPERATION" defers the actual tape error handling to a routine "HANDLEMAGTAPEEXCEPTION" (HMTE). The routine HMTE then calls COLLECT_LOG_SENSE_DATA to issue the appropriate sequence of I/Os to collect all of the required statistical data and append this information to the Input/Output Control Block (IOCB) associated with the overflow error condition before writing the statistical data to the SYSTEM/SUMLOG file.

The new procedure designated COLLECT_TAPE_STATS is a Master Control Program (MCP) procedure called by REWINDIT prior to a tape being unloaded. COLLECT_TAPE_STATS is a jacket procedure for the new MCP procedure COLLECT_LOG_SENSE_DATA. Its purpose is to put the tape unit in an expected state before calling COLLECT_LOG_SENSE_DATA and to return it to its initial state after the call.

The COLLECT_LOG_SENSE_DATA is a Master Control Program (MCP) procedure which is called through the procedure COLLECT_TAPE_STATS for REWINDIT when a tape is to be unloaded. Its purpose is to collect and store a SCSI Enhanced Tape's statistical data as returned by a sequence of SCSI Log Sense I/O Commands. An initial Log Sense command to retrieve page "00" is issued to determine the drive's "supported pages". The number of pages involved corresponds to the number of Log Sense I/Os to be issued to the tape drive. After all of the data is assembled, it is written to and stored in the SYSTEM/SUMLOG file (i.e., the SUMLOG) so that subsequent analysis of the statistical information can be performed as needed.

SUMMARY OF THE INVENTION

In order to overcome the situation in prior magnetic tape drives, where an Unload command would wipe-out the tape statistics so that no data would then be available as to Read/Write errors or other tape defects, the present system and method allows the retrieval and storage of tape statistics prior to the tape being unloaded.

The statistical data which accumulates in a peripheral tape drive's internal counters is reported to the MCP via an I/O Control Block (IOCB). This data is then placed and stored as a maintenance record in a Sumlog file.

A specialized algorithmic sequence is used wherein either 1) a Rewind/Unload tape request will initiate the REWNDIT procedure which then leads to the COLLECT_TAPE_STATS procedure that calls the COLLECT_LOG_SENSE_DATA, or 2) a Counter Overflow condition which leads to the HANDLEMAGTAPEEXCEPTION error handling procedure to invoke COLLECT_LOG_SENSE_DATA. COLLECT_LOG_SENSE_DATA then operates to collect the tape statistics for deposit into a Sumlog file on a disk.

Now that the tape statistics have been retrieved, they are now available to the User for analysis and display.

BRIEF DESCRIPTION OF THE DRAWINGS

FIGS. 4A, 4B, 4C, 4D, and 4E illustrate the detailed series of steps involved to fulfill the procedure of COLLECT_LOG_SENSE_DATA in Step D of FIG. 3.

GLOSSARY LIST

1. ARRAY: This is an ordered arrangement of data elements. A vector is a one-dimensional array, a matrix is a two-dimensional array. Most programming languages have the ability to store and manipulate arrays in one or more dimensions. Multi-dimensional arrays are used extensively in scientific simulation and mathematical processing.
2. ALLOCATE_MSG: This is a Master Control Program (MCP) procedure to allocate space for a message array. In the present case, this allocates space for the STATBUF array to collect the statistical information collected from the magnetic tape.
3. BUILDPRIMITIVEIOCB: This is a Master Control Program (MCP) procedure to allocate space for an Input/Output Control Block (IOCB) in a low level environment. This allocates memory for an IOCB in a low level area and sets up basic IOCB attributes.
4. COLLECT_TAPE_STATS: This is an MCP procedure called by REWNDIT prior to a tape being unloaded. The purpose of this procedure is to put a tape unit in the proper state to issue MCP I/Os and to call the next procedure designated COLLECT_LOG_SENSE_DATA.
5. COLLECT_LOG_SENSE_DATA: This is an MCP procedure called by COLLECT_TAPE_STATS for the REWINDIT procedure when a tape is unloaded. This MCP procedure is also called by the HANDLEMAGTAPEEXCEPTION procedure when a log counter overflow exception is encountered. The purpose of this procedure is to collect and log a SCSI Enhanced Tape's statistical data as returned by its SCSI Log Sense commands. This procedure invokes an initial command to retrieve Page 00 to determine the driver's supported pages. The number of pages corresponds to the number of Log Sense I/Os to be issued to the tape drive. After all of the data is assembled, it is then written to the Sumlog file.
6. COMBINELOGAREAS: This is an MCP procedure which is called to move the LOGMSG information associated with one IOCB to another IOCB. This procedure merges the IOCB LOGMSG data structures from two different I/O operations; namely, the LOGMSG associated with the IOCB for the I/O receiving a Log Counter Overflow exception and the LOGMSG associated with the IOCB used to retrieve the tape's statistical data.
7. DECODEEXTRD: This is a SYSTEM/LOGANALYZER command used to display or return analysis information for a particular maintenance log entry.
8. DOIO: This is a local procedure in COLLECT_LOG_SENSE_DATA that sets up IOCB attributes and initiates an I/O request to a specified unit. This procedure will set up IOCB attributes and initiate the I/O request specified by the Input/Output Control Word (IOCW) that is passed in. A buffer STATBUF, is attached to the IOCB with an array index indicating the area following the last Page's data, so that the next page's data returned will be appended to the end of the array.
9. DUMP_LOGSENSE_DATA: This is a procedure in the SYSTEM/JOBFORMATTER library used for statistical data analysis. This procedure analyzes and displays a tape's statistical data stored in the Sumlog for Enhanced SCSI tapes. This provides the valuable end result to the User.
10. DUMPEXTRD: This is a SYSTEM/LOGANALYZER command option which indicates that extended result descriptor information should be dumped for any applicable Sumlog entries. This is provided as input to the SYSTEM/LOGANALYZER program from the Operator Display Terminal (ODT).
11. EBCDIC: This is the Extended Binary Coded Decimal Interchange Code, which is a form of display that represents numbers as alpha-numric, that is to say, a mixture of numbers and special characters.
12. HANDLEMAGTAPEEXCEPTION: This is a MCP error handling procedure for tapes. It handles errors involved for a tape drive and stores information about those errors in the Sumlog. The acronym HMTE is used to designate this.
13. IOCB: This represents the Input/Output Control Block (IOCB) which is an MCP data structure used to communicate between the software and the hardware for I/O requests. An action to "Set IOCB Fields" is performed to set up attributes in an IOCB in order to issue Log Sense/Select commands to a SCSI Enhanced Tape.
14. IOCW: This represents an Input/Output Control Word (IOCW) which is a word variable that contains the logical information about an Input/Output request and which is included in an IOCB. An action to "Set IOCW" is used to set-up the IOCW variable in order to indicate that a Log Sense I/O, requesting a specific page, is to be issued.

15. Jobformatter Library: (also known as SYSTEM/JOBFORMATTER) This is a library called by the SYSTEM/LOGANALYZER program to analyze and to report a Sumlog entry. The log analyzer program will pass a Sumlog file entry to the Jobformatter Library for analysis and/or for reporting. The report can be generated on the operator Display Terminal (ODT), or to the printer.

16. SYSTEM/LOGANALYZER Program: This program controls the analysis of a Sumlog file. The LOGANALYZER program parses the Sumlog file and determines whether the user's specifications require an entry to be analyzed or displayed. If analysis or reporting is required, the entry is then passed on to the Jobformatter Library, where the analysis and the reporting is actually done.

17. LOGMSG: This is an MCP data structure containing log information about an entry for the Sumlog.

18. LOG COUNTER OVERFLOW: This is a warning/error condition returned by an I/O operation to indicate that a tape unit's internal statistical data counters are ready to overflow and should be retrieved. This condition causes entry into the procedure COLLECT_LOG_SENSE_DATA. Special considerations for logging the information in the Sumlog must be made to include this error/warning notification.

19. LOGIO: This a MCP procedure that takes information from a LOGMSG data structure and then writes it to the Sumlog. This procedure formats the information in the LOGMSG structure, then writes the I/O entry to the Sumlog.

20. LOG MAINT MT DUMPEXTRD: This is an Operator Display Terminal (ODT) Input to the LOGANALYZER program requesting analysis of I/O Sumlog entries. Any extended result data will be dumped.

21. LBUF: This represents an output buffer which provides parameters to effectuate the procedure MAINTLOGIOEXCEPTION.

22. LOG SENSE PAGE: (aka Log Sense page) This denotes the specific data returned from a magnetic tape drive in response to a Log Sense command requesting that Page's data. Each SCSI Enhanced tape type supports a set of Log Sense Pages (statistical data page) that correspond to a specific set of information (for example, a Page 02 returns Read Error information or a Page 03 returns Write Error information).

23. Log Select: This is a SCSI command issued after a set of Log Sense I/O's to clear out the tape driver's statistics. This acts to clear out the tape driver's internal registers of the accumlated Read errors, Write errors and other stored statistics.

24. LOG FILE: aka SYSTEM/LOG file or Sumlog file.

25. LRDLOGCOUNTEROVERFLOWID: This is an error-type indicator value generated by the MCP, after interpreting the unit's result descriptor (RD) that indicates one or more of the tape drive's internal statistical data counters are ready to overflow. This is an error identifier indicating the need to retrieve a magnetic tape's statistical information before it overflows.

26. LOG IOERROR DOMPEXTRD: This is a call made to invoke the Loganalyzer program with certain required output specifications. (It has the same basic functionality as the input request LOG MAINT MT DUMPEXTRD.) This constitutes an operator input command requesting the LOGANALYZER program to analyze the I/O error Sumlog entries with an analysis, and including any associated extended result data in semi-raw form.

27. Log Sense I/O: This is a SCSI command issued to a magnetic tape unit to gather statistical information that has been stored internally by the unit.

28. LRD or LOGICAL RESULT DESCRIPTOR: This MCP word is the logical representation of a physical error result returned by a unit.

29. LS_SUPPORTEDPAGES: This is a pre-defined value used by the procedure DUMP_LOG_SENSE_DATA that correlates the "supported pages" value returned by a tape drive after the issuance of a Log Sense command. This is defined to be "00".

30. MCP: This designates the Master Control Program Operating System (OS) for some Unisys Corporation platforms. The MCP functions in complete integration with hardware logic to simplify system operation and control. It provides automatic multiprogramming and multiprocessing, as well as centralized I/O control for peripheral and data communication devices. It automatically allocates system resources, including data and I/O processors, memory and peripherals. It manages all job and task initiation and control, local and remote operator interface and system security. The MCP automatically handles all disk file management, including space allocation, file assignment and access control. It features a form of memory management known as actual segment descriptor (ASD). ASD memory management expands the capacity, performance, and memory addressability of current enterprise server systems with the potential to address up to 24 GB (24 billion bytes) of memory.

31. MESSER: This is an MCP procedure that displays text information to the Operator Display Terminal (ODT).

32. LSIOCB: This is the local IOCB data structure that is used to issue all of the Log Sense/Select I/O's to the tape device in the MCP procedure COLLECT_LOG_SENSE_DATA.

33. NUMPAGES: This is an integer variable indicating the number of pages supported by the tape unit. NUMPAGES is initially derived from the length of the list of supported pages (each entry being one byte in length) returned by a Page 00 Log Sense I/O minus one (since Page 00 is in the list and has already been accounted for).

34. MAINTLOGIOEXCEPTION: This is a procedure in the Jobformatter Library used to handle the analysis of ID log information Sumlog entries.

35. MAINTENANCE RECORD: An I/O error entry in the Sumlog file in a format recognized by the MAINTLOGIOEXCEPTION procedure.

36. PUTYPE: This is the Physical Unit Type of a magnetic tape device. It is used to differentiate between the different types of SCSI Enhanced tape drives.

37. PAGE_LENGTH: This is an integer variable used in COLLECT_LOG_SENSE_DATA. This involves an action to "Set PAGE_LENGTH to the Size of the Page just retrieved (D22)". This will assign a value to the integer of PAGE_LENGTH indicating the actual size of the page just retrieved by a Log Sense I/O command.

38. PAGE_CODE: This is an integer variable used to indicate which particular page of the SCSI Log Sense command is being requested.

39. PAGE_TITLE: The PAGE_TITLE is a text string describing the contents of the Log Sense Page being displayed by Jobformatter. For example, Page 00 will display "Supported Pages" as its Page Title.

40. Page Control: Page Control is a field in the Log Sense/Select I/O Control Block.

41. PRINT_LOG_SENSE_DATA: This involves a procedure in the Jobformatter Library 22 to accomplish statistical data analysis. This procedure will analyze and/or display statistical tape data stored in the Sumlog for older, "non-enhanced" SCSI tapes.

42. REWIND/UNLOAD TAPE: This is a function of a tape drive that involves the action of moving a tape to its logical beginning prior to ejecting the tape media from the drive.

43. REWINDIT: This is an MCP procedure called when a tape rewind is requested. This handles the process of rewinding and unloading the tape.

44. RDSTATDATAX: This an integer value that designates the offset of the beginning of the "statistical data" portion of the Sumlog entry. This is also a parameter used in the procedure designated DUMP_LOG_SENSE_DATA.

45. RW MTx: This is a command to rewind and unload (or eject) a tape drive designated "x".

46. RESULT DESCRIPTOR: This is a reference to a word in the IOCB that pertains to the completion status of an I/O request. This result is returned in a format that allows the MCP to determine what error (if any) occurred as a result of issuing an I/O.

47. SYSTEM/LOGANALYZER: This is a program to analyze a Sumlog. This program is designed to produce a report consisting of all of the Sumlog entries that correspond to the input parameters which were set up by the User. The entries are extracted from the Sumlog and then formatted for display to either the printer or the Operator Display Terminal (ODT).

48. SUMLOG File: This is a file containing records of jobs previously run of the MCP activity, of I/O errors and other information regarding the past operational status of the machine environment. This file is written by the MCP to keep track of previous items of machine status. A special focus concerned herein is with the I/O entries which record a magnetic tape's statistical information.

49. SCSI: This represents the Small Computer System Interface which is an industry-standard Input/Output protocol used by peripherals for communication purposes.

50. STATISTIC INFORMATION: This refers to the statistical information retrieved from a SCSI Enhanced tape drive by issuing various Log Sense commands to the unit. The statistical information involves Read errors, Write errors and such information to determine if the magnetic tape or the tape drive is functioning properly.

51. STATBUF: This is the Statistics Buffer which is an array for holding information retrieved from a magnetic tape to indicate certain desired statistical information.

52. SBPTR: This is a pointer to the Statistics Buffer (STATBUF) which can indicate the position of certain data residing in a buffer array. An action to "initialize pointer SBPTR to STATBUF[0]" initializes the pointer SBPTR to the beginning of the array STATBUF. This array will hold the statistical data returned from the Log Sense I/O's given to the SCSI Enhanced magnetic tape.

53. SET PAGE CONTROL TO SCSI_DEFAULT_CUMULV: Page Control is a field in the CDB (Command Descriptor Block) used for the Sense/Select I/O's. This will set a field in the I/O command to indicate the type of parameter values to be returned in the subsequent Log Sense/Select I/O's. Some SCSI-Enhanced tape types require Default Cumulative values to be requested. (This is no longer used in the present embodiment).

54. STATDATABYTES: This is an integer variable used in the Input/Output Control Block (IOCB) to indicate the maximum amount of data to be transferred from the magnetic tape unit.

55. SCSI Enhanced Tape: This involves certain magnetic tape subsystems which are supported by software of the Unisys Corporation. These tape subsystems include— CTS5236; OST5136; CLU9710-36T; CLU9710-DLT4; CLU9710-DLT7. These are systems manufactured by StorageTek Corporation, Fujitsu and Quantum. SCSI Enhanced Tape refers to the family of SCSI half-inch cartridge tape subsystems adhering to the ANSI SCSI-2 standard. Each SCSI Enanced tape drive uses a form of half-inch cartridge media. The 36-track-subsystems use a 3890 or 3890 extended tape. The DLT subsystems use DLT tape cartridges.

56. Stat Report: This represents the statistics report that describes the statistical data returned by the SCSI Enhanced tape drive. The report is generated to the Operator Display Terminal (ODT) or to the printer by the Jobformatter Library 22, which analyzes a Sumlog file entry describing the statistics returned by the tape drive.

57. UNIT Table: An MCP table which contains an entry for every unit on the system. For tape units, it identifies the particular tape type and density among other specific tape drive information.

58. UNITATTRIBUTES Table: An MCP table which contains attribute information for each unit on the system. For tape drives in particular, it contains information regarding whether the tape clears its internal statistics as a result of an Unload command being issued or not.

General Overview

Most of the older magnetic tape drives keep statistical data until that data is specifically cleared by issuing a Log Select command after the tape's media is unloaded, which was performed after an "Unload" command is issued to the magnetic tape drive. However, with newer tape drives, once the tape drive "unloads" the tape media, the drive automatically clears the statistics so there is then no way to get statistical data from the magnetic tape drive about that particular tape media. This is designated as "the tape drive resets the statistics." This requires that the operating system read out the statistical data from these newer tape drives "before" the Unload operation and before the statistics get reset.

Statistical data is raw data returned from a magnetic tape and placed in an IOCB buffer. The data is formatted in a special way that it is documented in special specifications designated SCSI-2 Stream Device Command Set. The statistical data after being transferred to a buffer array is then manipulated by the Master Control Program (MCP) which takes the data and stores it into a Sumlog File (Log File).

The most useful aspect of getting and displaying the statistical data is for the operation of troubleshooting. The statistical data can be used by a Field Engineer to determine if the tape media is bad or going bad or whether the drive itself is bad or going bad. The Field Engineer can determine if a tape is compressing data as it should or whether the data being transferred to the drive is at its expected rate. From this information, the Field Engineer can also determine if the data correction algorithm that the tape drive uses is actually functioning correctly.

Thus, the older magnetic tape systems that operated on the basis of "clearing" statistics after the tape was "unloaded" have now adapted a more efficient system so that the data is not lost when the operator unloads the drive. Now it is possible to collect all of the desired statistical data prior to the tape being unloaded or when notification that the tape drive's data counters are in danger of overflowing so that none of this information is lost.

The presently described system handles the problem of maintaining the statistical data from the tape prior to the Unload command being invoked. Now there is a much more efficient operation in enabling the User to get access to statistical data in order to determine the quality of the magnetic tape drive system and the magnetic tape medium.

DESCRIPTION OF PREFERRED EMBODIMENT

Figure 1:
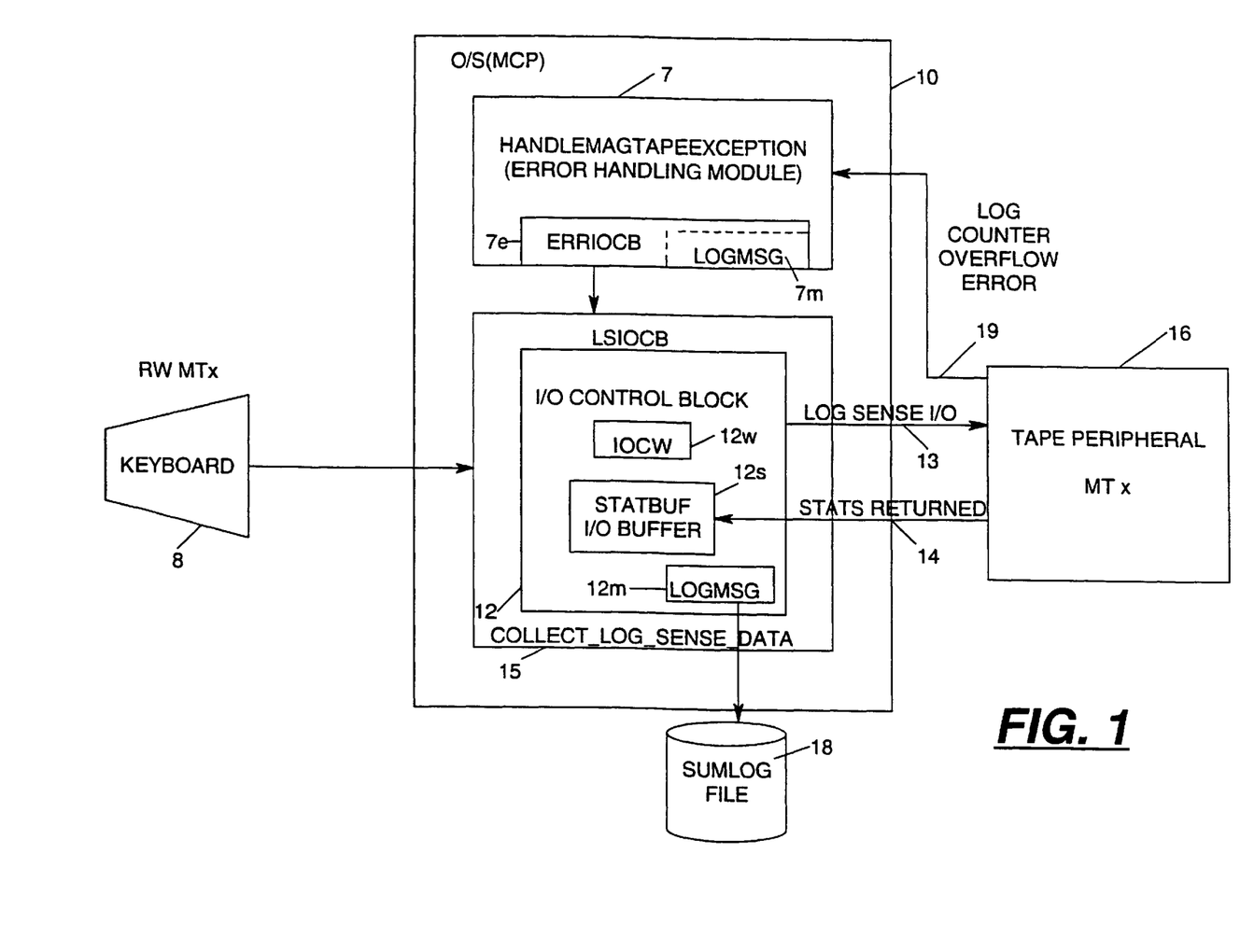
FIG. 1 is a block diagram showing the elements involved in retrieving statistics from a tape peripheral device.

Referring to FIG. 1, there is shown a block diagram indicating the elements involved in the present tape statistic retrieval system. A Keyboard 8 is used to enter "RW_MT_x" which is an operator command to Rewind and Unload (i.e., eject) a particular magnetic tape (MT) drive designated with the physical unit (PU) number "x". This command is transmitted to the operating system 10 designated as the Master Control Program (MCP).

Within the Operating System 10 (OS 10, MCP), the procedure COLLECT_LOG_SENSE_DATA (15) provides a Log Sense Input/Output Control Block, LSIOB, 12 with an Input/Output buffer 12s.

The I/O Control Block 12 holds an Input/Output Control Word (IOCW) 12w, an I/O Buffer 12s (STATBUF), and a LOGMSG data structure 12m.

The COLLECT_LOG_SENSE_DATA procedure 15 can also be invoked when a Tape Peripheral Unit 16 returns a Log Counter Overflow error 19. This error is intercepted by the MCP 10 tape error handling module, HANDLEMAGTAPEEXCEPTION 7. The I/O receiving the error, or ERRIOCB 7e, is then passed to the COLLECT_LOG_SENSE_DATA procedure 15.

Then, there is initiated a SCSI command designated Log Sense I/O on line 13 which is conveyed to the tape peripheral unit 16, also designated as Magnetic Tape unit x, or MTx.

The statistics are collected from internal counters within the Tape Peripheral unit 16 and returned on SCSI connection 14 designated Stats Returned, and then appended to the I/O buffer 12s (STATBUF) which then conveys these retrieved statistics to the SYSTEM/SUMLOG file, or Sumlog file 18.

Figure 2:
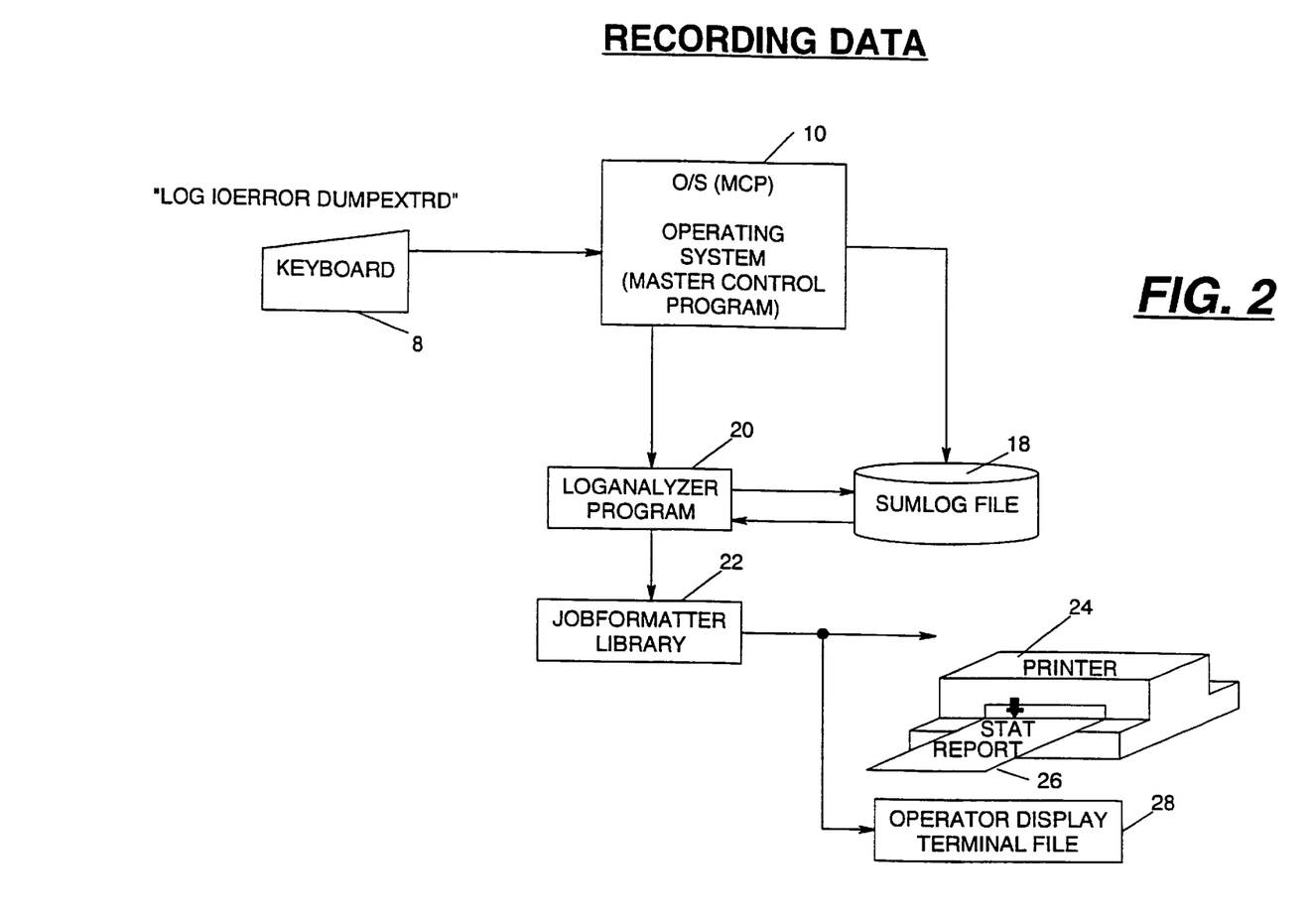
FIG. 2 is a block diagram showing the elements involved in recording data from a Sumlog file and establishing a statistic report.

Now referring to FIG. 2, the Keyboard 8 is used to enter operator Input command (LOG IOERROR DUMPEXTRD) which requests the LOGANALYZER program 20 to analyze the Input/Output error Sumlog entries in the Sumlog file 18, including analysis of any associated extended result data in semi-raw format. This extended function is the subject of a co-pending companion case, U.S. Ser. No. 09/209,983 entitled "System and Method for Analyzing and Reporting Tape Statisticsm".

The LOGANALYZER program (FIG. 2) of co-pending application Ser. No. 09/209,983 is designed to analyze the SYSTEM/SUMLOG file 18. This is a file that contains records concerning jobs previously run, the Naster Control Program activity and other associated information regarding the past status of the machine environment. The specifically important part of this file in the present invention is a special concern with and focus on retrieval of the I/O record entries recording a particular tape's statistical information.

The statistics report or Stat Report, is a report that describes the statistical data retrieved from the SCSI Enhanced Tape drive. This report is subsequently generated to the Operator Display Terminal (ODT) 28, (FIG. 2) or to the printer 24 by the JOBFORMATTER Library 22, which displays a Sumlog file entry 18 describing the statistics returned by the tape peripheral 16 (FIG. 1).

Figure 3:
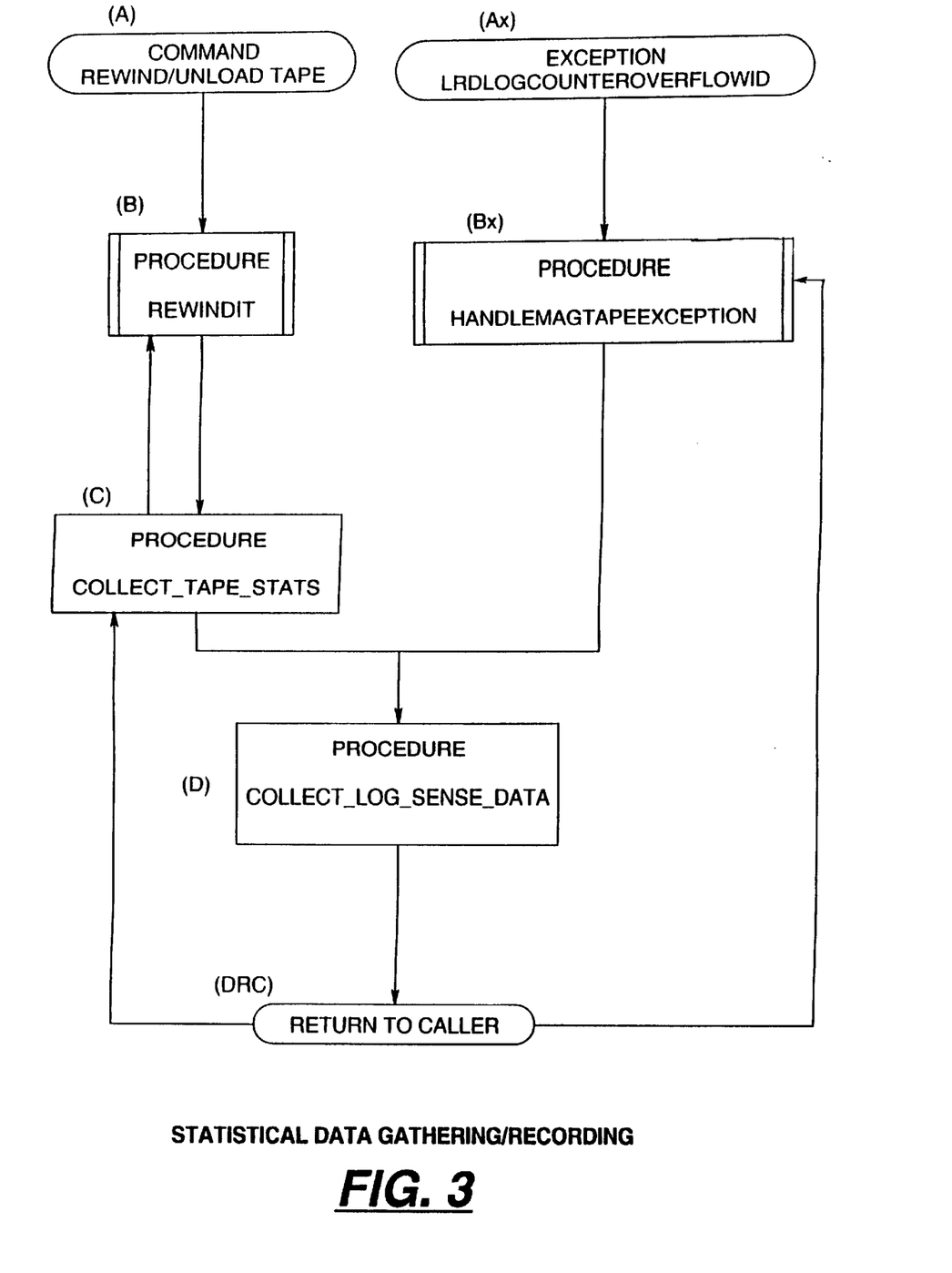
FIG. 3 is a flow chart showing an overview of the steps involved in retrieving the available statistics from a magnetic tape.

FIG. 3 is an overall macro look at the method of statistical data gathering and recording of magnetic tape data. This involves a series of steps designated A, B, C, D, and DRC.

At Step A, there is initiated a command to Rewind/Unload the tape. This is the action of moving a magnetic tape to its "logical beginning" prior to ejecting the tape media from the drive.

At Step B, there is initiated a procedure designated "REWINDIT". This is a Master Control Program (MCP) procedure called when a tape rewind is requested. This procedure involves the process of rewinding and unloading the tape.

At Step C, there is initiated a procedure designated "COLLECT_TAPE_STATS". This is a Master Control Program (MCP) procedure called by the REWINDIT procedure "prior" to a tape being unloaded. The purpose is to put a tape unit in the correct state to issue MCP I/Os prior to calling the next following procedure involving COLLECT_LOG_SENSE_DATA, and to undo state changes after the call.

Access to the tape unit needs to be suspended/halted until the MCP is done issuing I/Os. The "state changes" required, have to do with modifying Unit Tables (Glossary Item 58) in the MCP to indicate that no user I/Os can be issued until the MCP work is complete.

The next step is designated Step D which involves a procedure designated COLLECT_LOG_SENSE_DATA (15, FIG. 1). This is a Master Control Program (MCP) procedure which is called via the procedure COLLECT_TAPE_STATS for the REWINDIT procedure when a tape is to be unloaded.

The MCP tape error handling procedure (10, FIG. 1) is also seen in FIG. 3 at Step Bx designated HANDLEMAGTAPEEXCEPTION which occurs when a counter-overflow exception signal id is encountered.

This Stop Bx is initiated by Step Ax which is an "exception" condition designated LRDLOGCOUNTEROVERFLOWID. This involves an error generated by the Master Control Program Operating System 10 (FIG. 1) after interpreting the Result Descriptor (RD) returned by the tape unit that indicates one or more of the tape drivers statistical data buffers are ready to overflow, that is to say, the tape's buffer is incapable of handling any more data. This error ID indicates the need to retrieve a magnetic tape's statistical data before it overflows. Then, subsequently, at Step Bx, there is invoked the physical Input/Output error handling procedure for magnetic tapes, (HANDLEMAGTAPEEXCEPTION) which is initiated by the Master Control Program.

The procedure at Step D has the purpose to collect and to log a SCSI Enhanced Tape's statistical data as it was returned by its SCSI Log Sense command sequence. For example, an initial command to retrieve page "00" is issued to determine the "supported" pages. Supported Pages are the list of statistical data pages supported by the tape drive. The number of pages corresponds to the number of Log Sense I/Os, which are to be issued to the tape drive 16 of FIG. 1. After all of the data is assembled, it is written to the Sumlog, 18. The Sumalog is a file written by the Master Control Program 10 to keep track of previous machine status, and in particular interest to this invention, is concerned with the I/O entries recording a magnetic tape's statistical information data.

Then at Step DRC, FIG. 3, a return of information is made to the user-caller of this program to indicate that the information is now in the Sumlog file 18 and is now ready for subsequent analysis by the techniques taught in the co-pending companion case, U.S. Ser. No. 09/209,983 entitled "System and Method for Analyzing and Reporting Tape Statistics".

A preliminary look at some of the major procedures will be delineated after which a step-by-step discussion of FIG. 3, Steps A to D, and a detailed discussion of Step D (COLLECT_LOG_SENSE_DATA ) will be forthcoming hereinafter.

STEP C—COLLECT_TAPE_STATS (FIG. 3)

The procedure designated COLLECT_TAPE_STATS, Step C, FIG. 3, is the procedure which puts the MCP in the expected state to have the exclusive use of the tape unit and to issue the MCP I/Os to the magnetic tape unit.

Among the parameters involved is the "LU" which is a "logical unit" number for the magnetic tape unit that is being requested for its statistical data collection.

The "entry conditions" involved are called from REWINDIT when the following conditions are met:
(i) IOCW.IOTAPEUNLOAD is set indicating the REWIND should be issued with the Unload variant.
(ii) The tape's UNIT (Glossary Item 58) Table entry (in the MCP 10) indicates that it is a tape that clears statistics when it is unloaded.

There are no "exit conditions" involved at this stage.

Procedure Interfaces

The procedure COLLECT_TAPE_STATS then calls COLLECT_LOG_SENSE_DATA in order to perform the necessary sequence of Log Sense I/Os followed by a Log Select I/O.

There is a key Algorithm for COLLECT_TAPE_STATS
This involves the following functions (by the MCP):
(a) Suspend I/O activity to the designated Tape Peripheral unit (16, FIG. 1).
(b) Reserve the exclusive use of the Tape Peripheral unit for this MCP process.
(c) Invoke the COLLECT_LOG_SENSE_DATA MCP procedure (15, FIG. 1) to collect and log the Tape Peripheral unit's statistical data in the Sumlog file (18 FIG. 1).
(d) Unsuspend (i.e., allow) I/O activity to the Tape Peripheral unit, 16.
(e) Release the reservation of the Tape Peripheral unit to allow use by other processes.

STEP D PROCEDURE: COLLECT_LOG_SENSE_DATA (FIG. 3)

Procedures For COLLECT_LOG_SENSE_DATA, these involve (a) Parameters, (b) Entry Conditions, (c) Procedure interfaces and (d) a Key Algorithm an will be, hereinbelow. This COLLECT_LOG_SENSE_DATA procedure in FIG. 3. Step D, is called prior to a SCSI Enhanced tape (16) being Unloaded so that data can be retrieved "before" the tape drive "resets" its statistics as an affect of the tape drive being unloaded. This procedure is also called when a SCSI Enchanced tape (16) notifies the MCP (10) that one or more of the tape's statistic counters is ready to overflow so that the information can be collected before it is lost.

(a) Parameters: The following 3 parameters (i), (ii), (iii) are involved in the procedure COLLECT_LOG_SENSE_DATA.
(i) LU—a Logical Unit number for the magnetic tape unit requiring its statistical data to be collected;
(ii) PUTYPE—the Physical Unit TYPE of the tape unit specified by the logical unit (LU);
(iii) ERRIOCB—a valid I/O Control Block (IOCB) when the procedure is initiated by the MCP tape error handling procedure HANDLEMAGTAPEXCEPTION. In this case, ERRIOCB contains information regarding an I/O that received a Log Counter overflow error result. ERRIOCB is uninitialized (i.e., null) when the procedure in initiated as a result of a Rewind/Unload request.

(b) Entry Conditions: These are called from the procedure Step C, of FIG. 3 designated COLLECT_TAPE_STATS (which is called by REWINDIT) to issue the appropriate sequence of Log Sense and Log Select I/Os in order to collect, log, and reset all available Statistical Data for the tape.

These entry conditions are further called from the procedure HANDLEMAGTAPEEXCEPTION (Step Bx) when the following conditions are met:
(i) The I/O Control Block referenced by ERRIOCB is completed with an error indicating a Log Counter Overflow error. This signifies that one or more of the Tape Peripheral unit's internal statistic counters is ready to overflow and that some data may be lost if the statistics are not retrieved.
(ii) The Tape Peripheral unit's UNITATTRIBUTES table entry (Glossary Item 58) indicates that the Tape Peripheral unit involved is a unit that clears its statistics when media is unloaded. This tape attribute implies the unit is a SCSI Enhanced Tape that requires statistical data collection in the manner emloyed by the COLLECT_LOG_SENSE_DATA procedure.

(c) Procedure Interfaces: The procedure COLLECT_LOG_SENSE_DATA calls a local procedure DOIO (Step D8, FIG. 4A) to set up the Input/Output Control Block 12 (IOCB) and to issue the requested I/O to the magnetic tape unit 16. This procedure interface has three parameters which are:
(ci) IOCW:—A Log Sense or a Log Select IOCW (Input/Output Control Word, 12w) that has the appropriate variants for Page Code and Page Control;
(cii) BUFFINX:—An index into the IOCB buffer 12s (i.e. STATBUF) that points past the last Page's data;
(cii) IOLENGTH:—The maximum amount of data to be retrieved from the tape unit 16 into the IOCB, buffer, 12s (STATBUF).

Figure 4A:
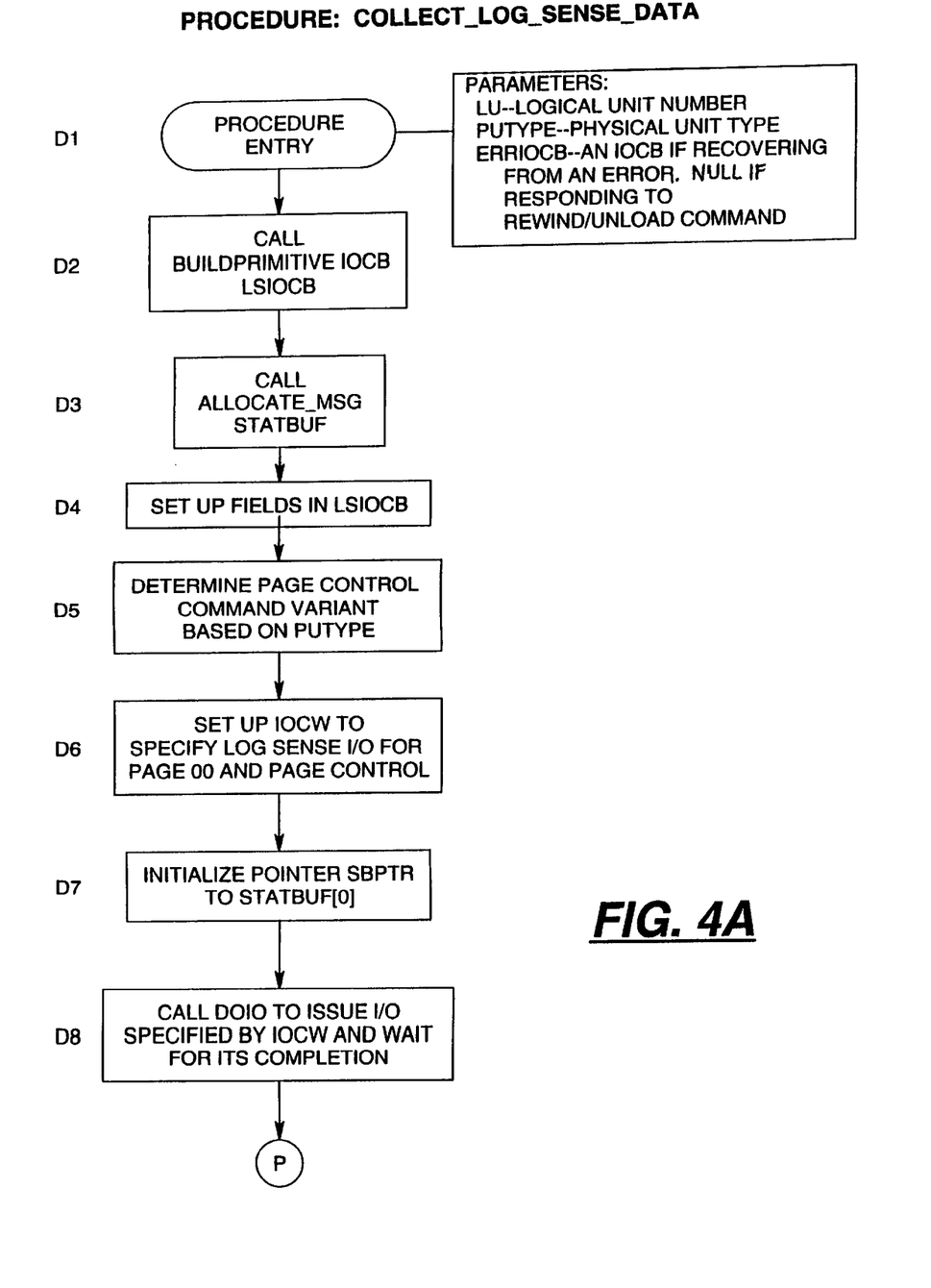
FIG. 4A is a flow chart indicating the procedure (D) for collecting the Log Sense data.

Step DS (DOIO) of FIG. 4A occurs after the MCP's pointer (SBPTR) is initialized to point to the beginning of the statistics buffer 12s. This results in the supported log pages of the Tape peripheral 16 being read into the I/O buffer, 12s FIG. 1.

Other Procedure Interfaces: COLLECT_LOG_SENSE_DATA invokes several MCP procedures to aid in the retrieval of a Tape Peripheral unit's statistical data.

BUILDPRIMITIVEIOCB (FIG. 4A, D2) is called to allocate space for an Input/Output Control Block (IOCB) 12 for the purpose of issuing I/Os in an MCP environment.

ALLOCAT_MSG (step D3, FIG. 4A) is called to allocate space for an MCP area or buffer for a specified size. It's parameters are an array (area) and a size.

DOIO (step D8, FIG. 4A) is a procedure declared locally in COLLECT_LOG_SENSE_DATA. It's purpose is to issue an I/O specified by an I/O Control Word (IOCW) 12w associated with an IOCB 12 and to wait for the I/O to complete. It's parameters include an IOCW, a buffer index (where data can be transferred to/from) and an I/O length (maximum amount of data to be transferred into the buffer). The IOCB used is the IOCB space allocated by BUILDPRIMITIVEIOCB above and the buffer area is the area space allocated by ALLOCATE_MSG above.

MESSER (FIG. 4C, D19N1) is an MCP procedure called to send message to the ODT (FIGS. 2, 28). A message number is provided that corresponds to a text string containing the information that needs to be related to a user.

COMBINELOGAREAS (D35, FIG. 4E) is an MCP procedure called to merge a LOGMSG data structure contained in one IOCB with the LOGMSG data structure contained in another IOCB. The LOGMSG data structure contains information about an I/O that should eventually be stored or logged in the Sumlog file 18. It takes as parameters two IOCBs.

LOGIO (D36, FIG. E) is an MCP procedure that takes an IOCB's LOGUSG data structure and formats it in a way that the System/Jobformatter 22 program can effectively analyze and report it. It takes as a parameter the IOCB containing the LOGMSG to interpret.

FORGETPRIMITIVEIOCB (D37, FIG. 4E) is called to give back space previously allocated for an IOCB in an MCP environment. This allows the MCP to use this space for other processes or tasks. It takes as a parameter the IOCB area that was allocated the space originally.

(d) Key Algorithm: The process of collecting a Tape Peripheral unit's statistical data involves 3 basic steps. First, an initial Log Sense I/O is set up and issued to the Tape Peripheral unit 16 requesting Page Code 00. This Page's data is retrieved into the I/O buffer 12s and consists of a list of Page Codes supported by the Tape Peripheral unit 16.

The second step involves parsing through this list of Page Codes, issuing a Log Sense I/O for each page that contains pertinent or valuable data. Each Page's data is retrieved into the I/O buffer 12s, effectively being appended to the end of the last Page's data. When all of the Pages have been addressed, the third and last step is initiated.

This last step consists of clearing out the Tape Peripheral unit 16 internally stored statistical counters and writing/storing the statistical data retrieved to the Sumlog file 18. To clear the Tape Peripheral unit's internal counters, a Log Select I/O 12 is issued to the unit 16.

A more detailed look at the key algorithm is provided in the flowcharts described hereinafter, involving FIG. 3 and then FIGS. 4A through 4E.

The procedure designated COLLECT_LOG_SENSE_DATA (FIG. 3, Step D) is a procedure involving a sequential number of steps which will be shown and designated as D1 through D38. The initial steps are shown in the flow chart of FIG. 4A and the subsequent steps are shown on the subsequent FIGS. 4B through 4E.

Referring to FIG. 4A at Step D1, there is initiated a procedure entry of certain parameters which involve the Logical Unit number (LU), the Physical Unit type (PUTYPE) and an Input/Output Control Block (ERRIOCB), indicated at 7e of FIG. 1. The ERRIOCB also has an associated LOGMSG data structure, 7m.

At Step D2, this stop involves a Master Control Program (MCP) procedure to allocate space for an Input/Output Control Block (LSIOCB 12) in an MCP Environment. This step allocates memory for a Log Sense IOCB and sets up some basic IOCB attributes.

At Step D3, an invocation is made via the Master Control Program procedure to allocate space for a message area or array 12s, (STATBUF). This allocates space for the array STATBUF 12s to store the statistical information collected from the tape.

At Step D4, setting the LSIOCB fields involves setting-up attributes in an Input/Output Control block 12 to issue Log Sense/Select commands to a SCSI Enhanced tape. The IOCB is a Master Control Program (MCP) data structure used to communicate between the software and the hardware for Input/Output (I/O) requests.

At step D5, depending on the PUTYPE or Physical Unit type of the tape involved, a Log Sense/Select I/O command Page Control variant must be determined. Some SCSI Enhanced tape types (i.e., CLU9710-DLT and OST5136 tapes) provide relevant data when Current Cumulative values are requested, others (CLU9710-36T and CTS5236 tapes) require a Page Control variant to specify Default Cumulative values.

The Page Control Variant (Byte 2.[7:2] of the Log Sense SCSI command) is a value (between 0 and 3) that denotes the type of parameter values to be selected when issuing a Log Sense command. These values can be:

0—The Current Threshold values which are the maximum values each parameter is set to at the last reset of the device (usually because of a Log Select command).

1—The Current Cumulative values which are the values computed since the last reset of the device.

2—The Default Threshold Values are the maximum values that each parameter can attain.

3—The Default Cumulative Values are the values to which each parameter gets initialized on a reset condition. Default values are zero.

At Step D6, the IOCW (Input/Output Control Word) variable is set-up to indicate that a Log Sense I/O requesting Page 00 is to be issued. This Page returns a list of the pages supported by the Physical Unit Tape type. IOCW is a "real" variable that contains the logical information about the I/O request and is included in an IOCB.

At Step D7, the pointer SBPTR (Statistical Buffer Pointer) is initialized to the beginning of the array STATBUF (Statistics Buffer) at index 0. The SBPTR is an uninitialized pointer, while STATBUF itself is an EBCDIC array (Extended Binary Coded Decimal Interchange Code), which is a form of display that represents numbers as alpha-numeric values. EBCDIC format also implies that the size of each array element is 1 byte (8 bits) which is typically the size used to represent alpha-numeric characters.

At Step DS, the procedure DOIO is instituted. This is a local procedure that sets-up LSIOCB 12 attributes and also initiates an I/O request to a specified tape unit 16. This procedure will set-up some IOCB attributes such as a maximum transfer length and a buffer index and initiate the I/O request specified by the IOCW parameter. The buffer 12s STATBUF is attached to the LSIOCB 12 with an array index indicating the area after the last Page's data so that the requested Page's data will be appended to the end of the array. At the end of this step, successful completion expects that the requested Page's data has been transferred into STATBUF at the index indicated by the buffer index parameter BUFINDEX.

Figure 4B:
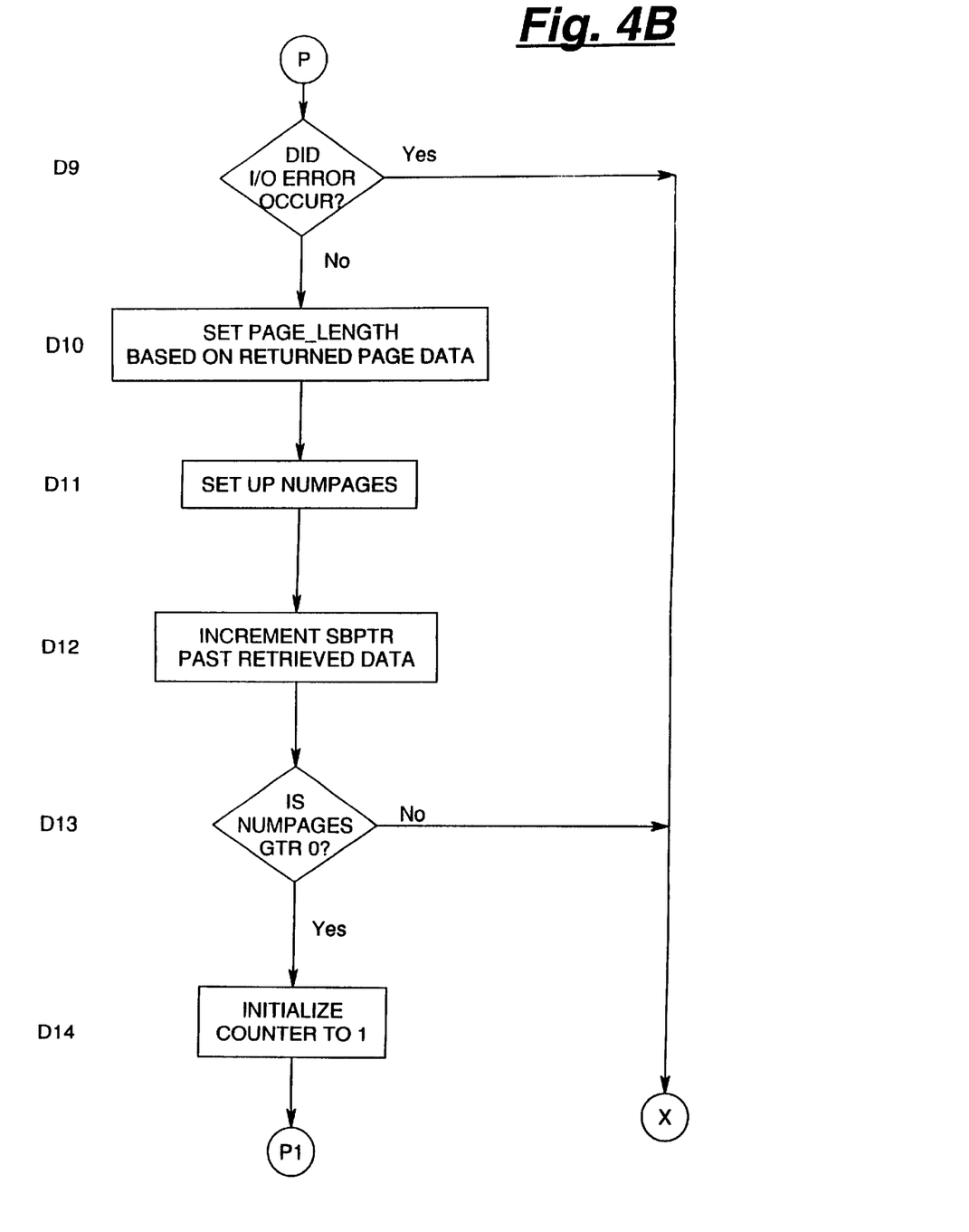

At Step D9, FIG. 4B, a decision block occurs in the program as to whether or not there has been an I/O error. If an error caused this data not to be retrieved, there is no way to determine what set of Page Codes the tape unit 16 supports and there is no list of supported Pages to parse through in the pursuit of collecting the tape's statistical data. Therefore, if this is a "yes", then Step D29 results with reference to the "X" line on FIGS. 4B, C, D, E and effectually skips the second basic portion of the algorithm altogether. If there is "NO" error, then Step D10 is next in operation.

At Step D10, this involves setting the variable PAGE_LENGTH to be the value returned by the Log Sense I/0 that indicates the length in bytes of the returned data, plus the length of the page header descriptor (4 bytes). PAGE_LENGTH is a variable integer.

At Step D11, this involves a variable integer indicating the "number of pages" supported by the specific tape drive 16. NUMPAGES is initialized to be the number of pages (bytes)

returned by a Log Sense I/0 for Page Code 00 minus 1 (since each Page Code is represented by a single byte of data and Page Code 00 has already been retrieved).

At Step D12, the SBPTR pointer is incrementally moved past the data in STATBUF that was returned from the last Log Sense I/O command issued to the Tape. SBPTR is a pointer to the STATBUF, 12s.

At Step D13, a decision block is initiated to question as to the number of pages (bytes) returned by a Log Sense I/O as to whether this value is greater than zero, or not greater than zero. This is determining if there are any Pages supported by the tape unit 16. If the number of pages is greater than zero (YES), then the sequence proceeds to D14. If the number of pages is not greater than zero (No), then the sequence moves to reference mark "x", which is subsequently shown in FIGS. 4B, 4D, 4E to Step D29 and which effectually skips the second basic part of the algorithm to further collect statistical data.

At Step D14, a counter is initialized to one for the purpose of looping through the number of Pages (NUMPAGES) supported by the tape unit 16. This concludes the first basic portion of the algorithm as previously described.

Figure 4C:
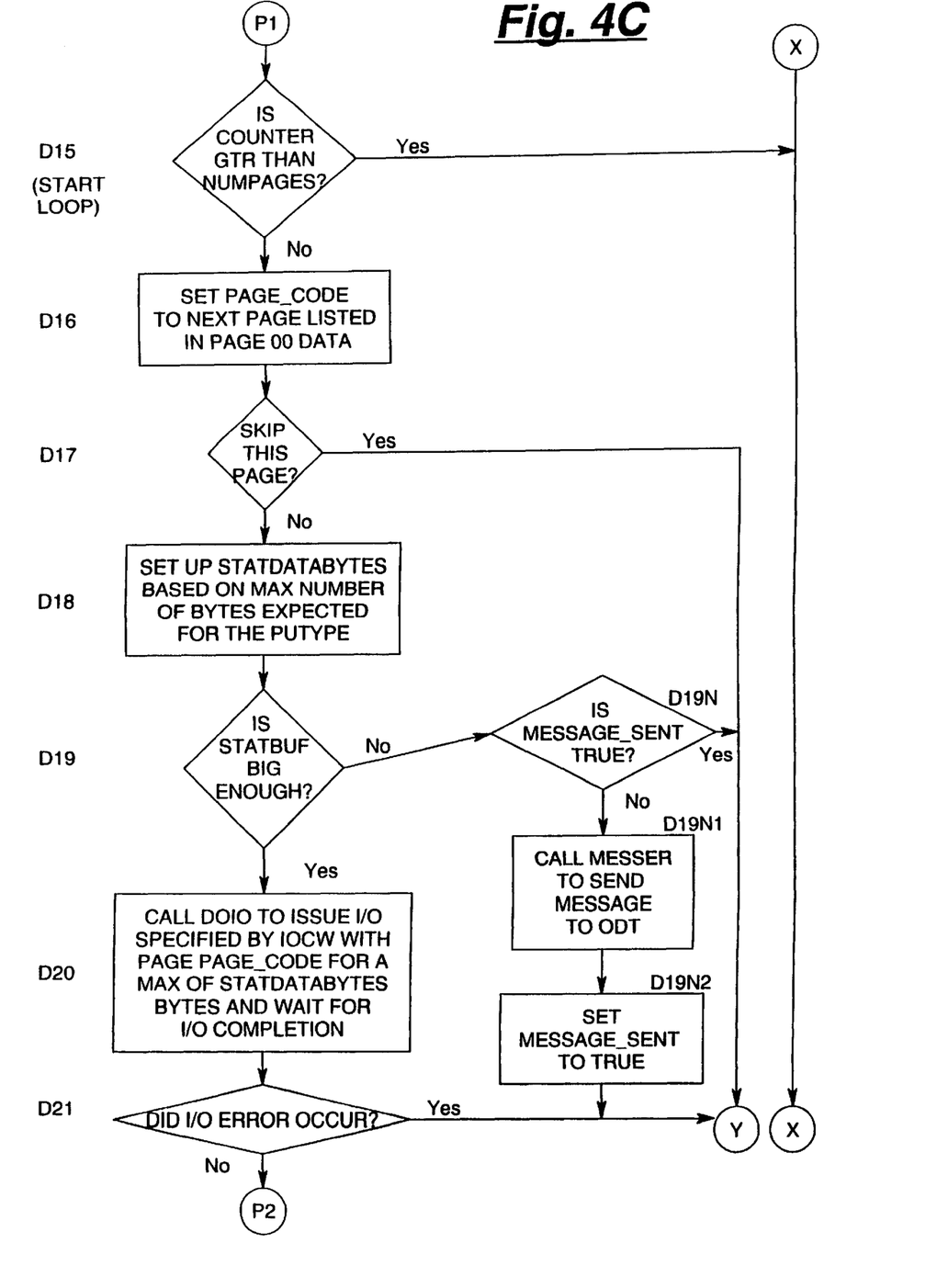

Referring to FIG. 4C, the next step shown is Step D15. This is the beginning of the programmatic loop in order to retrieve each individual Page out of the total set of Pages supported by the magnetic tape 16. Here a decision block asks whether the counter value is greater than the number of pages supported by the tape unit 16. If "Yes," there are no more Page Codes to be addressed, the loop terminates and program goes via "X" step D29. If "No," the program goes to D16.

At Step D16, the program sequence will then get the next Page Code. The Page Code PAGE_CODE is a variable integer which indicates the page to be requested in a Log Sense command. The integer PAGE_CODE is set to indicate the "next page" in the list of pages returned by a Log Sense I/O for Page 00.

At step D17, a question is posed as to whether or not to skip the next Page on the basis of it not providing valuable or relevant information. If the answer is "Yes," the Page should be skipped, the process resumes at the beginning of the loop at Step D15. If the Page has information that has value, the answer is "No" and the process continues at step D18. The following Tape Peripheral unit Pages are deemed as not valuable or conditionally valuable:

1. OST5136—Page Code 3E*h,* Return all Pages page—due to the size of the buffer required to capture all of the returned data. It is more feasible to collect the statistical data one Page at a time.
2. CTS5236—no Pages are skipped. (All Pages have value).
3. CLU9710-DLT—Page Code 07, Last N Error Events—due to the size and expected value of the information returned. The decision to skip this Page can be bypassed by a user by specifying an MCP option prior to unloading the tape.
4. CLU9710-36T - Page Code 30*h,* Vendor Unique Page—since this Page provides identical data without formatting as Page Code 31*h.*

At Step D18, the integer STATDATABYTES is set to indicate the number of bytes expected from a Log Sense I/O operation. These lengths are specific to each SCSI Enhanced tape type. As was indicated, STATDATABYTES is a variable integer, while PUTYPE is the physical unit type involved.

At Step D19, another decision block is reached. Here at Step D19, the question arises whether the statistics buffer 12s (STATBUF) is large enough to hold the number of bytes of the next Page's expected data in addition to the current data already contained in the buffer log page. Here, if the answer is (NO), then a message must be relayed to the ODT28 as shown at Steps D19N, D19N1, D19N2. However, if the statistics buffer is large enough to hold the log page (YES), then the sequence proceeds to Step D20.

At step D19N, if it was determined that the statistics buffer was "too small" then another decision is required. Here the question arises as to whether a message has already been sent to the ODT28 indicating that all of the statistical data could "not be retrieved" due to the size of the buffer 12s. A Boolean variable, MESSAGE_SENT, is interrogated. If the value of MESSAGE_SENT is TRUE, then the decision block evaluates to a "Yes" response and the flow continues via "Y" to the top of the loop at Step D28. If the value of MESSAGE_SENT is "FALSE", then the decision block D19N evaluates to a "No" response and the flow continues to step D19N1. [Note that on procedure entry, the value of MESSAGE_SENT is initially FALSE.

At Step D19N1, the MCP procedure MESSER is invoked to display the desired message on the ODT28 indicating that some "statistical data could not be retrieved".

At Step D19N2, the Boolean variable MESSAGE_SENT is assigned the value of TRUE, indicating a message has "already been sent" to the ODT 28. This will preclude any further messages from burdening the user should other Pages be excluded due to buffer size restraints. Flow then continues via "Y" to the top of the loop at step D28.

At Step D20, the procedure DOIO is initiated to "do" the I/O operation specified by IOCW 12*w* with the page PAGE_CODE for the maximum length of STATDATABYTES bytes, then waits for the data to be transferred from the peripheral tape unit 16 into the Statistics Buffer 12s. When this I/O is completed, the sequence moves to Step D21.

Figure 4D:
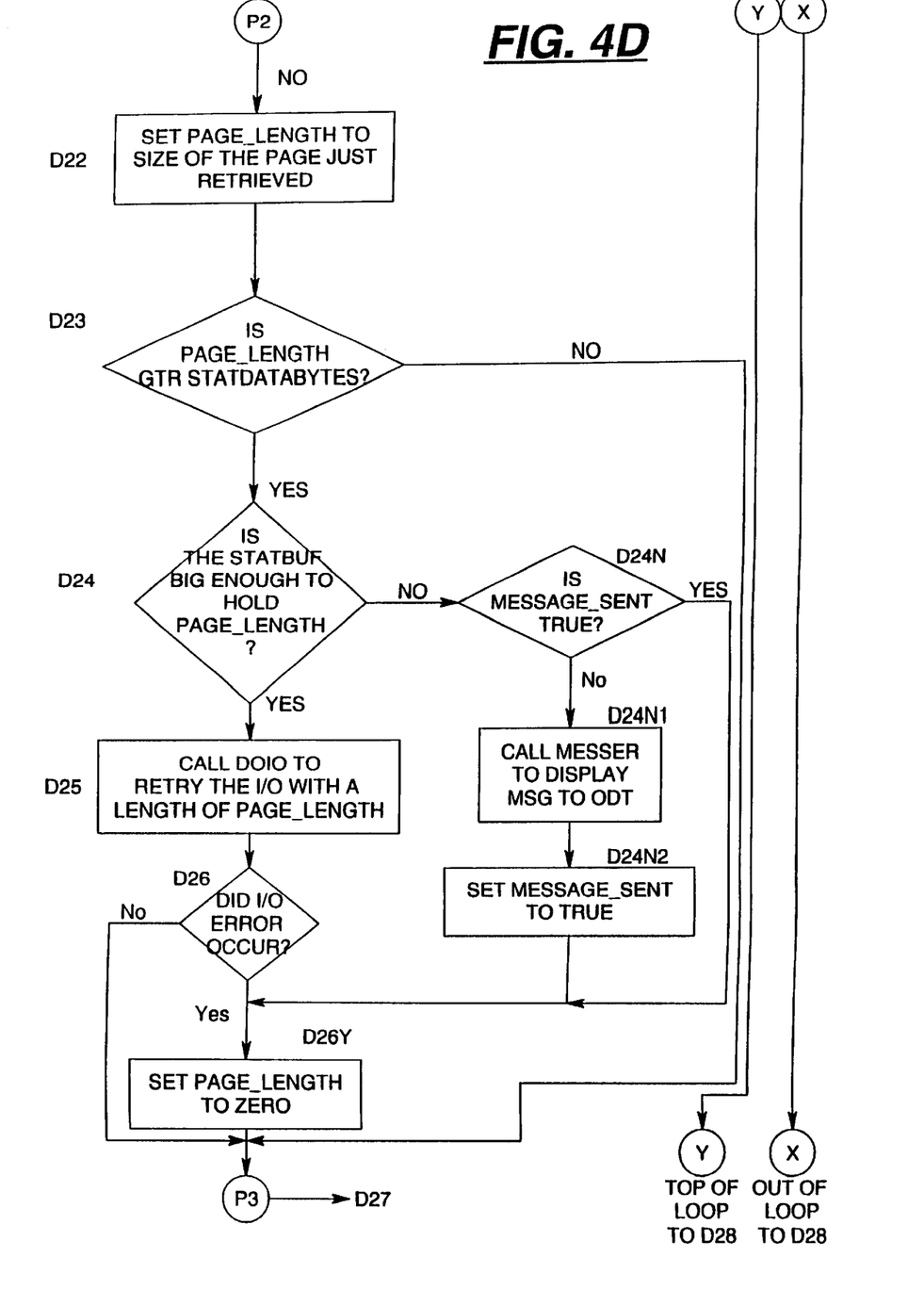
Figure 4E:
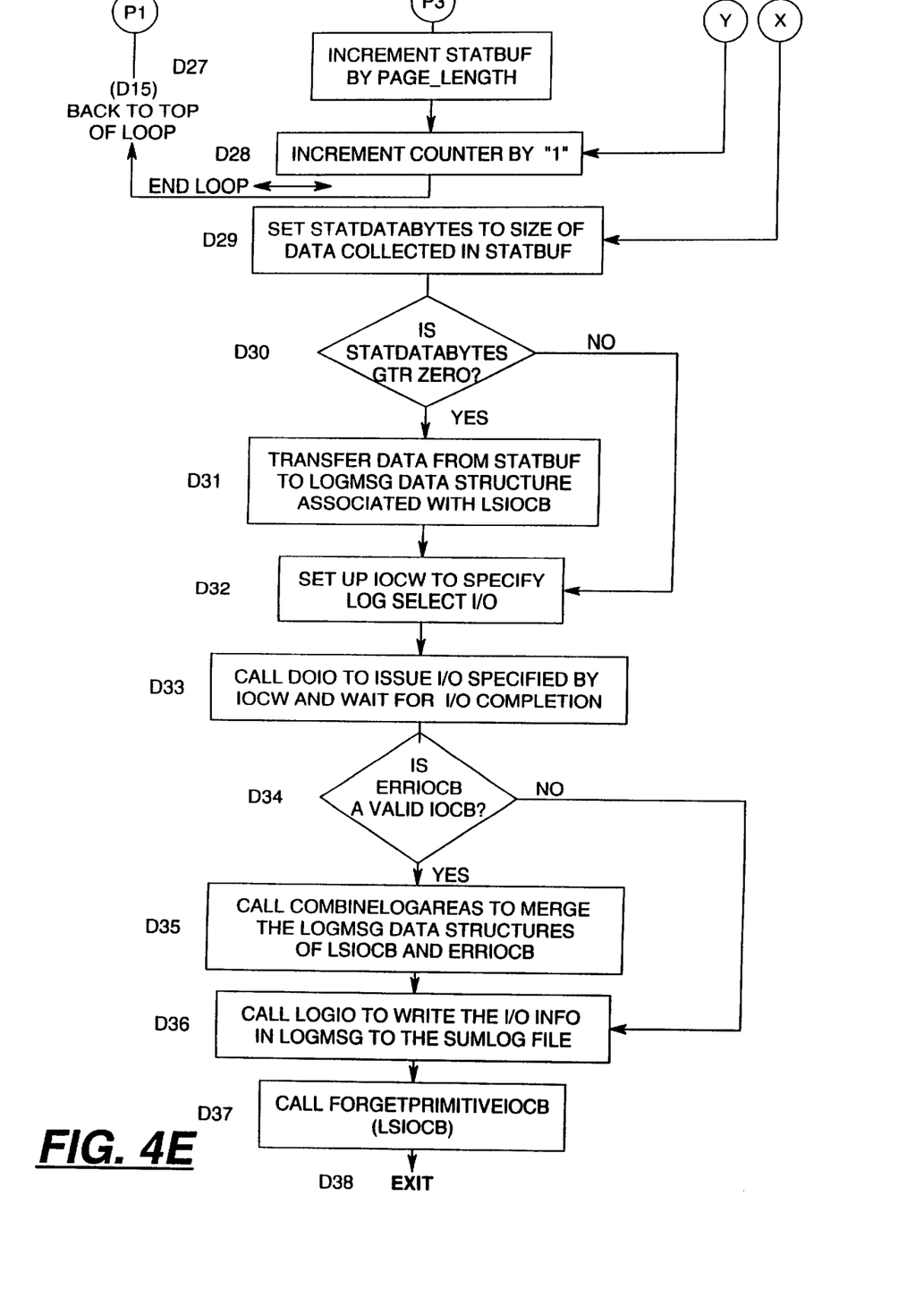

At Step D21, a decision block asks—Did an I/O Error occur? If "Yes", then line marker "Y" indicates via FIGS. 4C, 4D, 4E that Step D28 is next initiated.

At Step D21, if "No" is the result, then Step 22 of FIG. 4D is next operated.

At Step D22, the program will set the variable PAGE_LENGTH to the size of the log Page, just retrieved in Step D20. This length indicates the actual length of the Page, not the expected maximum length of the Page. Since vendors can and do make modifications to the data returned by Log Sense I/Os, this length of the data is subject to change.

At Step D23, (FIG. 4D) a comparison decision block is involved which compares the value in PAGE_LENGTH (the actual length of the Page) to the value of STATDATABYTES (the expected/max length of the Page). The question is whether the actual page length is greater than the number of data bytes retrieved. If this is not the case (NO), then the sequence proceeds to reference mark "P3", which is shown in FIG. 4E culminating at Step D27.

If the PAGE_LENGTH at Step D23 is greater than the number of available statistic buffer data bytes (STATDATABYTES) (YES), then the sequence goes to Step D24, where another decision block is presented. Here, the question is whether the statistic buffer (STATBUF) 12s, can hold a PAGE_LENGTH amount of more data. If the answer is (NO), then the sequence proceeds to Steps D24N, D24N1 and D24N2.

If the statistic buffer (STATBUF) 12s is big enough to hold the PAGE_LENGTH (YES), then the sequence goes to Step D25.

At Step D25, a call is made to DOIO to retry the last Log Sense I/O with new PAGE_LENGTH length.

At Step D26, a decision block operates to check if an I/O error occurred. If "Yes," then Step D26Y sets the PAGE_LENGTH to "0" prior to proceeding to marker "P3" over to Step D27. If "No", directly proceed to the marker P3 which indicated at FIG. 4E that D27 is the next step.

At step D24N, the question "Is MESSAGE_SENT equal TRUE" is posed. If the answer is "Yes," the process skips to step D26Y. If the answer is "No, " the sequence flows to step D24N1. At step D24N1, the MCP procedure MESSER is invoked to display a message, "Some statistics could not be logged due to buffer size," on the ODT28.

At step D24N2, the Boolean MESSAGE_SENT is set to TRUE.

At step D26Y, the variable PAGE_LENGTH is assigned the value "0" to indicate that no valid data was retrieved for the current Page.

Now referring to FIG. 4E via reference mark P3, at Step D27, it is seen that there occurs an incrementation of the statistics buffer pointer SBPTR by PAGE_LENGTH, (i.e.) past the last retrieved data).

Then at Step D28, the loop will repeat after the Counter is incremented by one until all the pages involved (NUMPAGES) are handled thus ending the programmatic loop which presents the retrieval of all of the log page's data.

As seen in FIGS. 4B and 4C and 4D, the marker line "X" connects to Step D29. Here at Step D29, the number of statistic data bytes (STATDATABYTES) is set to the size of the data collected in the Statistics Buffer 12s.

Then at Step D30, a decision block is reached which asks the question—Is the number of statistic data bytes greater than zero? If the answer is "No", then the sequence moves over to step D32. If the answer is "Yes", then Step D31 occurs.

At Step D31, data is transferred from the Statistics Buffer 12s to the LOGMSG Data Structure (12m) associated with the Log Sense Input/Output Control Block 12 (LSIOCB).

The next step is Step D32, where a I/O Control Word (IOCW) is set up to specify the Log Select I/O operation.

At Step D33, a call is made to do the Input/Output operation to issue an I/O command specified by the Control Word (12w) and then wait for the Input/Output operation to be completed.

At Step D34, a decision block is set up to question as to whether the Error I/O Control Block, (ERRIOCB) (7e) is a valid Input/Output Control Block (i.e., not null). If the answer is "No", then the system will move to Step D36. If the answer is "Yes", then Step D35 occurs whereby there is a merging of data structures of the LOGMSG 7m and the LOGMSG 12m as effectuated by the MCP 10.

Then at Step D36, a call is made to the LOGIO MCP procedure to write the Input/Output information residing in LOGMSG 12m over into the Sumlog File 18.

At Step D37, a call is made to forget or give back the space allocated for the IOCB designated LSIOCB 12, so the MCP can use this space for other processes.

After the operation of the Step D37, then there is an exiting of the program at Step D38.

Described herein has been a system and method for handling the problems with newer tape drives, wherein once the tape drive unloads the tape media, then the tape drive automatically clears its statistics so there is no longer any way to get statistical data from the magnetic tape drive about the particular tape media. The present system makes it possible to collect all of the desired statistical data of the tape media prior to the tape being unloaded or alternatively, when notification of the tape drive's data counters are in danger of overflowing, then the desired statistical data can still be collected so that none of this information is lost.

While other embodiments of the presently described invention may include other configurations, it should be understood that the subject invention is defined by the following claims.

What is claimed is:

1. A system for retrieving tape statistics from a magnetic tape drive means utilizing tape media before an unload command can destroy such statistics, said system comprising:
   (a) magnetic tape drive means for reading and writing magnetic tape and media;
   (b) operating system means for sequencing an Unload command on said tape drive means for retrieving tape statistical data onto a statistics buffer wherein said operating system means includes:
      (b1) a Log Sense I/O Control Block holding an I/O Control Word, a statistics buffer, and a Log Message data structure whereby a keyboard User initiates said I/O Control Word to execute Log Sense I/O commands to gather tape statistics data in a statistics buffer for accumulation in said Log Message data structure;
      (b2) means to transfer said accumulated statistics data from said Log Message data structure to an external recording means;
   (c) depositing said tape statistical data from said statistics buffer onto an external storage means.

2. A system for retrieving tape statistics from a magnetic tape drive means utilizing tape media before and unload command can destroy such statistics, said system comprising:
   (a) magnetic tape drive means for reading and writing magnetic tape media;
   (b) operating system means for executing an Unload command on said tape drive means for retrieving tape statistical data into a statistics buffer wherein said operating system means includes:
      (b1) a Log Sense Input/Output Control Block connected to said tape drive means by a SCSI connection means, said Log Sense I/O Control Block including an Input/Output Control Word which provides Log Sense I/O commands to said tape drive means, and further includes a statistics buffer, which receives statistics returned from said tape drive means, said Log Sense Input/Output Control Block also including a first Log Message (LOGMSG) data structure for accumulating retrieved statistics;
      (b2) means to execute a program designated COLLECT_LOG_SENSE_DATA to convey said statistics data and error data to said external storage means;
      (b3) error handling means connected via a log counter overflow error line from said tape drive means for storing error information in a second LOGMSG data structure for subsequent merger with said first LOGMSG unit for conveyance to said external storage means;
   (c) depositing said tape statistical data from said statistics buffer onto said external storage means.

3. A system for retrieving tape statistics from a magnetic tape drive means for deposit on an external recording medium comprising:
   (a) a magnetic tape drive means connected via SCSI connection means to a Log Sense Input/Output Control Block;
   (b) a Master Control Program Operating System for operating an error handling means and a Log Sense Input/Output Control Block means, each of which is connected to said magnetic tape drive means, said Operating System being responsive to an external user keyboard;

(c) said Log Sense Input/Output Control Block means being operative under a program designated COLLECT_LOG_SENSE_DATA, and including:

(c1) an Input/Output Control Word that presents the logical information for an Input/Output request and invokes a Log Sense command to request a specific page in the tape media of the magnetic tape drive;

(c2) an I/O buffer means for receiving via SCSI connection means, a series of tape statistics from said magnetic tape means;

(c3) a Log Message data structure for accumulating statistics and data for subsequent conveyance to said storage medium;

(c4) an error handling means connected to receive log counter overflow errors from said tape drive means, said error handling means including an error I/O control block and a log message unit for collecting error overflow data.

4. A system for retrieving tape statistics from a magnetic tape drive means for placement on an output recording medium comprising:

(a) magnetic tape drive means for Reading and Writing magnetic tape media;

(b) operating system means for executing an Unload command on said tape media and for retrieving tape statistical data for placement on an Output recording medium, said operating system including:

(i) a Log Sense Input/Output Control Block means for holding an Input/Output Control Word, for holding an Input/Output buffer and for holding a first Log Message data structure, said Log Sense Input/Output Control Block connected to said tape drive means via a SCSI connection means, said Log Sense Input/Output Control Block means operating to collect pages of statistical data from said tape media for accumulation in a Log Message data structure for conveyance to an output recording medium;

(ii) error-handling means receiving a log counter overflow error signal from said tape drive means, said error handling means including an error Input/Output Control Block and a second Log Message data structure for collecting error data upon occurrence of an overflow.

5. A method, utilizing an internal operating system, for retrieving tape statistics from a SCSI enhanced magnetic tape drive means using magnetic tape media which allows the retrieval of tape statistics prior to an Unload command where normally such Unload command would delete the tape statistics, said method comprising the steps of:

(a) initiating a Rewind/Unload tape command via a user keyboard;

(b) initiating by said operating system of a REWINDIT operation for unloading data from said magnetic tape drive means;

(c) initiating a COLLECT_TAPE_STATS procedure to put said magnetic tape drive means in a condition to read out tape statistics;

(d) initiating, by said operating system, of a procedure designated COLLECT_LOG_SENSE DATA, in order to collect and log statistical data from said magnetic tape media via a sequence of Log Sense SCSI commands;

(e) utilizing each Log Sense command to retrieve a page of statistical data;

(f) assembling pages of statistical data and writing them to an external recording medium.

6. The method of claim 5 wherein Step (d) includes the COLLECT_LOG_SENSE data steps of:

(d1) entering the logical unit number and physical type for the magnetic tape drive means;

(d2) building an Input/Output control block to allocate space for a message array in a statistics buffer;

(d3) setting Input/Output control block fields in said Input/Output control block to enable the issuance of LOG SENSE/LOG SELECT commands to a SCSI Enhanced tape;

(d4) checking to identify the physical unit type of the SCSI enhanced magnetic tape drive means;

(d5) selecting the type of parameter values to be returned in each LOG SENSE/LOG SELECT I/O command;

(d6) indicating a list of pages of statistical data to be retrieved;

(d7) initializing a statistics buffer pointer to the beginning point of the array of information in said statistics buffer to hold statistical data;

(d8) initiating an I/O request to a specified tape drive means, as specified by an Input/Output Control Word in said I/O Control Block so that the next forthcoming page's data will be appended to the end of the statistics buffer.

7. A method for retrieving tape statistical data from a magnetic tape drive means for deposit on an output recording medium comprising the steps of:

(a) executing, by a user keyboard, the command to Rewind/Unload the tape of said magnetic drive means;

(b) executing an operating system procedure for rewinding the tape of the magnetic tape drive to initiate retrieval of data from the magnetic tape;

(c) executing an operating system procedure designated COLLECT_TAPE_STATS to put the said magnetic tape drive means in the proper state to issue I/Os and then to call the procedure designated COLLECT_LOG_SENSE_DATA;

(d) executing said COLLECT_LOG_SENSE_DATA operating system procedure to collect and log a SCSI Enhanced tape's statistical data as returned by a series of SCSI Log Sense commands;

(e) depositing said collected magnetic tape drivers statistical data to an output recording medium.

8. The method of claim 7 wherein step (d) COLLECT_LOG_SENSE_DATA includes the steps of:

(c1) allocating space in an Input/Output Control Block with designated areas for an Input/Output Control Word, for an I/O buffer and for a Log Message data structure;

(c2) determining the type of page control variant required based on the physical unit type of the magnetic drive;

(c3) setting up an Input/Output Control Word to specify the Log Sense Input/Output for page "00" and the page control value to designate the number of pages of statistical data involved;

(c4) initializing a statistics buffer pointer to the beginning position of said I/O buffer which stores statistics;

(c5) executing an Input/Output operation as designated by an Input/Output Control Word;

(c6) setting the page length based on the amount of data returned by the page "00";

(c7) setting-up the number of pages which is supported by the particular magnetic tape drive unit;

(c8) incrementing the statistics buffer pointer past the data just retrieved;

(c9) setting an integer STATDATABYTES in the Input/Output Control Block to indicate the maximum amount of data to be transferred from the magnetic tape drive means, and issuing a series of Log Sense I/Os to collect the tape drive means' statistical data so long as the number of available pages is still greater than "00";

(c10) transferring data from said Input/Output Control Block (STATBUF) to the LOGMSG unit 12*m*;

(c11) indicating via the I/O Control Word to specify the Log_Select Input/Output operation;

(c12) executing an Input operation to complete the I/O specified by the Input/Output Control Word;

(c13) merging the data of a first Log Message data structure derived from said tape drive means with error-derived data in a second Log Message data structure and placing this data in said first Log Message data structure;

(c14) transferring the data, which is merged in said first Log Message data to an output recording medium.

* * * * *